United States Patent
Lee et al.

(10) Patent No.: US 9,777,194 B2
(45) Date of Patent: Oct. 3, 2017

(54) PRESSURE-SENSITIVE ADHESIVE COMPOSITION

(71) Applicant: LG Chem, Ltd., Seoul (KR)

(72) Inventors: Min Ki Lee, Daejeon (KR); No Ma Kim, Daejeon (KR); Sung Soo Yoon, Daejeon (KR); Han Na Chi, Daejeon (KR); Su Jeong Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/591,331

(22) Filed: Jan. 7, 2015

(65) Prior Publication Data

US 2015/0125632 A1 May 7, 2015

Related U.S. Application Data

(63) Continuation of application No. PCT/KR2014/005377, filed on Jun. 18, 2014.

(30) Foreign Application Priority Data

Jun. 19, 2013 (KR) ........................ 10-2013-0070632

(51) Int. Cl.
| | |
|---|---|
| *C09J 7/02* | (2006.01) |
| *G02F 1/13* | (2006.01) |
| *C09J 133/10* | (2006.01) |
| *C09J 153/00* | (2006.01) |
| *C08G 18/62* | (2006.01) |
| *C08G 18/81* | (2006.01) |
| *G02B 5/30* | (2006.01) |

(52) U.S. Cl.
CPC ........ *C09J 7/0221* (2013.01); *C08G 18/6229* (2013.01); *C08G 18/6254* (2013.01); *C08G 18/8116* (2013.01); *C09J 133/10* (2013.01); *C09J 153/00* (2013.01); *C09J 153/005* (2013.01); *G02F 1/1306* (2013.01); *B32B 2457/202* (2013.01); *C08G 2170/40* (2013.01); *G02B 5/3033* (2013.01); *Y10T 428/1059* (2015.01); *Y10T 428/2848* (2015.01)

(58) Field of Classification Search
None
See application file for complete search history.

(56) References Cited

U.S. PATENT DOCUMENTS

| | | | |
|---|---|---|---|
| 7,385,007 B2 * | 6/2008 | Moroishi et al. | 525/192 |
| 2005/0181148 A1 | 8/2005 | Kim et al. | |
| 2006/0154098 A1 | 7/2006 | Dollase et al. | |
| 2008/0011419 A1 | 1/2008 | Everaerts et al. | |
| 2009/0275705 A1 * | 11/2009 | Fujita | C08F 293/00 525/342 |
| 2011/0135921 A1 | 6/2011 | Tse et al. | |
| 2011/0178246 A1 * | 7/2011 | Moeller et al. | 525/100 |
| 2011/0244218 A1 * | 10/2011 | Suzuki et al. | 428/323 |
| 2012/0070660 A1 | 3/2012 | Miyazaki et al. | |

FOREIGN PATENT DOCUMENTS

| | | | | |
|---|---|---|---|---|
| EP | 1865003 A1 | 12/2007 | | |
| EP | 2366750 A1 | 9/2011 | | |
| JP | 07-082542 | * 3/1995 | ............ | C09J 151/08 |
| JP | H11116644 A | 4/1999 | | |
| JP | 2009251177 A | 10/2009 | | |
| KR | 10-0594514 B1 | 6/2006 | | |
| KR | 10-1023839 B1 | 3/2011 | | |
| KR | 10-1171976 B1 | 8/2012 | | |
| KR | 10-1171977 B1 | 8/2012 | | |
| TW | 201100485 A | 1/2011 | | |
| WO | 2004050781 A1 | 6/2004 | | |
| WO | 2012-132115 A1 | 10/2012 | | |

OTHER PUBLICATIONS

International Search Report from PCT/KR2014/005377, dated Sep. 25, 2014.
Written Opinion of the International Searching Authority, dated Sep. 25, 2014.
Office Action from corresponding Taiwanese Application No. 103121225, dated Jun. 10, 2015.
Search Report from European Application No. 148144025, dated Oct. 26, 2016.

* cited by examiner

*Primary Examiner* — Anthony J Frost
(74) *Attorney, Agent, or Firm* — Lerner, David, Littenberg, Krumholz & Mentlik, LLP

(57) ABSTRACT

The present invention relates to a pressure-sensitive adhesive composition. The pressure-sensitive adhesive composition of the present invention can provide a pressure-sensitive adhesive having low time-dependency of dependability and adhesion strength and having excellent interfacial adhesion strength. After being applied to an optical member such as a polarizing plate, the pressure-sensitive adhesive composition exhibits excellent interfacial adhesion strength and maintains excellent dependability without time-dependency.

17 Claims, No Drawings

PRESSURE-SENSITIVE ADHESIVE COMPOSITION

CROSS-REFERENCE TO RELATED APPLICATION

The present application is a continuation of International Application No. PCT/KR2014/005377, filed on Jun. 18, 2014, which claims priority to and the benefit of Korean Patent Application No. 10-2013-0070632, filed on Jun. 19, 2013, the disclosures of which are hereby incorporated herein by reference.

BACKGROUND

1. Field of the Invention

The present invention relates to a pressure-sensitive adhesive composition, an optical laminate, a polarizing plate, and a display device.

2. Discussion of Related Art

Typically, a liquid crystal display device (hereinafter, referred to as "LCD device") includes a liquid crystal panel containing a liquid crystal component injected between two transparent substrates and an optical film. The optical film may include a polarizing film, a retardation film, or a brightness enhancement film.

In order to laminate such optical films or attach the optical film to an adherend such as a liquid crystal panel, a pressure-sensitive adhesive for an optical film is generally used. A pressure-sensitive adhesive may use an acrylic polymer, rubber, a urethane resin, a silicon resin, or an ethylene vinyl acetate (EVA) resin.

As a pressure-sensitive adhesive for an optical film, particularly a polarizing plate, a pressure-sensitive adhesive including an acrylic polymer which has excellent transparency and high dependability without time-dependency is generally used.

Patent Documents 1 to 3 describe a pressure-sensitive adhesive composition used for an optical film.

Patent Document 1: Korean Patent No. 1023839
Patent Document 2: Korean Patent No. 1171976
Patent Document 3: Korean Patent No. 1171977

SUMMARY OF THE INVENTION

The present invention is directed to a pressure-sensitive adhesive composition, an optical laminate, a polarizing plate, and a display device.

The present invention relates to a pressure-sensitive adhesive composition.

An exemplary pressure-sensitive adhesive composition may include a block copolymer. The term "block copolymer" as used in the present specification may refer to a copolymer including blocks of different polymerized monomers.

In an exemplary embodiment, the block copolymer may include a first block having a glass transition temperature of 50° C. or more and a second block having a glass transition temperature of −10° C. or less. In the present specification, "glass transition temperature of a certain block" in the block copolymer may refer to a glass transition temperature measured from a polymer formed of only monomers included in the block.

The block copolymer may be formed in various ways as long as it includes a first block and a second block. If necessary, the block copolymer may include a third block in addition to the first block and the second block. In an example, as the block copolymer, a diblock copolymer including the first block and the second block in sequence, a triblock copolymer including the first block, the second block, and the first block in sequence, or a mixture of the diblock copolymer and the triblock copolymer may be used.

In an example, the glass transition temperature of the first block may be 60° C. or more, 65° C. or more, 70° C. or more, or 75° C. or more. Further, the upper limit of the glass transition temperature of the first block is not particularly limited, and may be, for example, about 150° C., about 140° C., about 130° C., or about 120° C.

Further, the glass transition temperature of the second block may be −40° C. or less, −45° C. or less, −50° C. or less, or −60° C. or less. Furthermore, the lower limit of the glass transition temperature of the second block is not particularly limited, and may be, for example, about −100° C., about −90° C., about −80° C., or about −75° C.

The block copolymer including at least the above two blocks may form a micro-phase separation structure within the pressure-sensitive adhesive. Such a block copolymer exhibits adequate cohesion and stress relaxation property depending on a change in temperature and thus can form a pressure-sensitive adhesive that maintains excellent properties required for an optical film such as dependability, light leakage prevention property, and reworkability, and the block copolymer can be applied to an optical member such as a polarizing plate and show an adhesive property without time-dependency.

In the block copolymer, the first block may have a number average molecular weight (Mn) in a range of, for example, 2,500 to 150,000. The number average molecular weight of the first block may refer to, for example, a number average molecular weight of a polymer prepared by polymerizing only monomers constituting the first block. The "number average molecular weight" as used in the present specification can be measured by a method suggested in Examples using, for example, a GPC (Gel Permeation Chromatography). In another exemplary embodiment, the number average molecular weight of the first block may be 5,000 to 100,000 or 10,000 to 50,000.

Further, the block copolymer may have a number average molecular weight of 50,000 to 300,000. In another exemplary embodiment, the number average molecular weight of the block copolymer may be about 90,000 to about 250,000, about 90,000 to about 200,000, or about 90,000 to about 180,000.

The block copolymer may have a molecular weight distribution (PDI; Mw/Mn), i.e. a ratio (Mw/Mn) of a weight average molecular weight (Mw) to a number average molecular weight (Mn), in a range of about 1.0 to about 2.5, or about 1.4 to about 2.5. By regulating the molecular weight characteristic as described above, a pressure-sensitive adhesive composition or pressure-sensitive adhesive having excellent properties can be provided.

Monomers of the first block and the second block in the block copolymer are not particularly limited in kind as long as the glass transition temperatures as described above can be obtained by combination of the respective monomers.

In an example, the first block may include a polymerized unit induced from a methacrylic acid ester monomer. In the present specification, a monomer included as a polymerized unit in a polymer or a block may mean that the monomer forms a skeleton, for example, a main chain or a side chain, of the polymer or the block through a polymerization reaction. As the methacrylic acid ester monomer, for example, alkyl(meth)acrylate may be used. For example, in consideration of regulation of cohesion, a glass transition temperature, and a pressure-sensitive adhesive property, alkyl(meth)acrylate including an alkyl group having 1 to 20 carbon atoms, 1 to 16 carbon atoms, 1 to 12 carbon atoms, 1 to 8 carbon atoms, or 1 to 4 carbon atoms may be used. Examples of the monomer may include methyl (meth) acrylate, ethyl (meth)acrylate, n-propyl(meth)acrylate, isopropyl(meth)acrylate, n-butyl (meth)acrylate, t-butyl (meth) acrylate, sec-butyl (meth)acrylate, pentyl(meth)acrylate, 2-ethylhexyl(meth)acrylate, 2-ethylbutyl (meth)acrylate, n-octyl(meth)acrylate, isobornyl(meth)acrylate, isooctyl (meth)acrylate, isononyl(meth)acrylate, or lauryl(meth) acrylate. One or two or more monomers may be selected from the above-described monomers and used such that the above-described glass transition temperature can be obtained. Although not particularly limited, in consideration of easiness in regulation of a glass transition temperature, among the above-described monomers, a methacrylic acid ester monomer such as alkyl methacrylate including an alkyl group having 1 to 20 carbon atoms, 1 to 16 carbon atoms, 1 to 12 carbon atoms, 1 to 8 carbon atoms, or 1 to 4 carbon atoms may be used as the monomer constituting the first block.

The second block of the block copolymer may include a (meth)acrylic acid ester monomer and a copolymerizable monomer including a radical polymerization group. Further, the second block may further include a thermosetting functional group. In this case, the thermosetting functional group may be included as being contained in the copolymerizable monomer in the second block.

In an example, the second block may include a polymerized unit induced from 90 to 99.9 parts by weight of a (meth)acrylic acid ester monomer and 0.1 to 10 parts by weight of a copolymerizable monomer having a radical polymerization group and a thermosetting functional group. In the present specification, the unit "parts by weight" may mean a weight ratio between components. For example, as described above, the second block including a polymerized unit induced from 90 to 99.9 parts by weight of a (meth) acrylic acid ester monomer and 0.1 to 10 parts by weight of a copolymerizable monomer having a radical polymerization group and a thermosetting functional group means that a weight ratio (A:B) of the (meth)acrylic acid ester monomer (A) and the copolymerizable monomer (B) having a radical polymerization group and a thermosetting functional group, which form the polymerized unit of the second block, is 90 to 99.9:0.1 to 10.

As the (meth)acrylic acid ester monomer constituting the second block, a monomer which can finally obtain a glass transition temperature in the above-described range through copolymerization with the copolymerizable monomer may be selected from the monomers, which can be included in the first block, and used. In consideration of easiness in regulation of a glass transition temperature, although not particularly limited, the (meth)acrylic acid ester monomer may employ an acrylic acid ester monomer such as alkyl acrylate including an alkyl group having 1 to 20 carbon atoms, 1 to 16 carbon atoms, 1 to 12 carbon atoms, 1 to 8 carbon atoms, or 1 to 4 carbon atoms from the above-described monomers.

In an example, the second block may include a main chain including an (meth)acrylic acid ester monomer and a copolymerizable monomer having a thermosetting functional group in the form of a polymer; and a radical polymerization compound which is bonded to the thermosetting functional group of the main chain and provides a radical polymerization group.

In the present specification, the term "copolymerizable monomer having a thermosetting functional group" refers to a copolymerizable monomer having a thermosetting functional group and also having a portion which can be copolymerized with a (meth)acrylic acid ester monomer. The thermosetting functional group refers to a functional group capable of realizing a cross-linked structure by reaction with the cross-linker under the condition where an adequate amount of heat is applied, such as a drying process or an aging process. For example, the thermosetting functional group may be a hydroxyl group, a carboxyl group, an amino group, an isocyanate group, or an epoxy group, preferably a hydroxyl group or a carboxyl group. Generally, the portion which can be copolymerized with a (meth)acrylic acid ester monomer is a double bond between carbon atoms, but is not limited thereto.

In an example, as for the copolymerizable monomer having a thermosetting functional group, a copolymerizable monomer having a hydroxyl group as a thermosetting functional group may include 2-hydroxyethyl (meth)acrylate, 2-hydroxypropyl(meth)acrylate, 4-hydroxybutyl (meth) acrylate, 6-hydroxyhexyl(meth)acrylate, 8-hydroxyoctyl (meth)acrylate, 2-hydroxyethyleneglycol(meth)acrylate, or 2-hydroxypropyleneglycol(meth)acrylate, and a copolymerizable monomer having a carboxyl group as a thermosetting functional group may include (meth)acrylic acid, 2-(meth) acryloyloxy acetic acid, fumaric acid, itaconic acid, maleic acid, or maleic acid anhydride, but they are not be limited thereto.

In the present specification, the term "radical polymerization compound" refers to a compound having a radical polymerization group and a functional group which can react with a thermosetting functional group. The radical polymerization group refers to a functional group which can be induced to be radically polymerized by light irradiation or heat application, and the functional group may be, for example, a double bond between carbon atoms. The functional group which can react with a thermosetting functional group may be an isocyanate group if the thermosetting functional group is a hydroxyl group, an amino group, or a substituted amino group; the functional group may be an isocyanate group, an aziridinyl group, an epoxy group, or an oxazoline group if the thermosetting functional group is a carboxyl group; and the functional group may be an amino group, a carboxyl group, or an aziridinyl group if the thermosetting functional group is an epoxy group, but it is not limited thereto.

The main chain may include 90 to 99.9 parts by weight of a (meth)acrylic acid ester monomer and 0.1 to 10 parts by weight of a copolymerizable monomer having a thermosetting functional group in the form of a polymer. If the copolymerizable monomer having a thermosetting functional group is in an amount of less than 0.01 part by weight, cohesion decreases, and thus, there may be a problem with durability. If the copolymerizable monomer is in an amount of 10 parts by weight or more, adhesion strength decreases, and thus, there may be a problem with durability.

In an example, the radical polymerization compound may be a compound expressed by the following Chemical Formula 1; a compound expressed by the following Chemical Formula 2; a compound expressed by the following Chemical Formula 3, a reaction product of a multifunctional isocyanate compound and a compound expressed by the following Chemical Formula 4; a reaction product of a multifunctional isocyanate compound, a polyol compound, and a compound expressed by the following Chemical Formula 4, and a compound expressed by the following Chemical Formula 5, but it is not limited thereto:

[Chemical Formula 1]
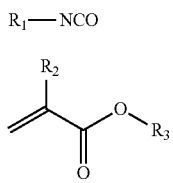

[Chemical Formula 2]
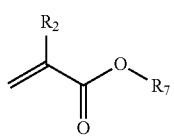

[Chemical Formula 3]
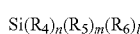

[Chemical Formula 4]
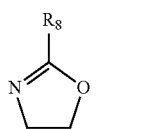

[Chemical Formula 5]
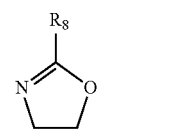

In the above Chemical Formulas 1 to 5, $R_1$ represents an alkyl group substituted with a (meth)acryloxy group; an alkyl group substituted with a (meth)acryloxy alkyl group; an alkyl group substituted with an alkenylphenyl group; a (meth)acryloyl group; a (meth)acryloxy group; or an alkenyl group, $R_2$ represents hydrogen or an alkyl group, $R_3$ represents hydrogen; an alkyl group substituted with an aziridinyl group; or a glycidyl group, $R_4$ represents a (meth)acryloxyalkyl group, $R_5$ represents a halogen atom, $R_6$ represents an alkyl group, $R_7$ represents a hydroxyalkyl group, $R_8$ represents an alkenyl group, $n+m+1$ represents 4, and n and m independently represent 1 to 3.

In the definition of the Chemical Formulas 1 to 5, the alkyl group may be, for example, an alkyl group having 1 to 20 carbon atoms, 1 to 16 carbon atoms, 1 to 12 carbon atoms, 1 to 8 carbon atoms, or 1 to 4 carbon atoms; the alkenyl group may be, for example, an alkenyl group having 2 to 20 carbon atoms, 2 to 16 carbon atoms, 2 to 12 carbon atoms, 2 to 8 carbon atoms, or 2 to 4 carbon atoms, and may be, for example, a vinyl group, an allyl group, or an isoprophenyl group; and the halogen atom may be, for example, a chlorine atom.

To be more specific, the compound may include one or two or more of 2-isocyanatoethyl (meth)acrylate, 1,1-bis (acryloyloxymethyl)ethyl isocyanate, (meth)acryloyloxyethyl isocyanate, metha-isoprophenyl-a,a-dimethyl benzylisocyanate, methacryloyl isocyanate, or allyl isocyanate; an acryloyl monoisocyanate compound obtained by a reaction between a diisocyanate compound or a polyisocyanate compound with a (meth)acrylic acid 2-hydroxyethyl; an acryloyl monoisocyanate compound obtained by a reaction between a diisocyanate compound or a polyisocyanate compound, a polyol compound, and a (meth)acrylic acid 2-hydroxylethyl; (meth)acrylic acid glycidyl; (meth)acrylic acid; 3-methacryloxy propyldimethyl chlorosilane; 2-(1-aziridinyl)ethyl (meth)acrylate; and 2-vinyl-2-oxazoline or 2-isoprophenyl-2-oxazoline.

A molar amount of the radical polymerization compound bonded to the main chain may be 0.01 time to 1 time, 0.02 time to 0.9 time, or 0.03 time to 0.8 time. A molar amount of the radical polymerization compound is a value obtained by divining a part by weight of the radical polymerization compound bonded to the block copolymer by a molar mass (g/mole) of the radical polymerization compound, and a molar amount of 1 part by weight of the copolymerizable monomer having a thermosetting functional group may be the reciprocal of a molar mass (g/mole) of the copolymerizable monomer. By regulating the molar amount of the radical polymerization compound bonded to the main chain within the above-described range, it is possible to prevent an excessive increase in peeling force or cohesion of the pressure-sensitive adhesive or a decrease in a peeling process efficiency or dependability.

In an example, the radical polymerization group and the thermosetting functional group may not be included in the first block but may be included only in the second block. By regulating the radical polymerization group and the thermosetting functional group to be selectively included only in the second block, it is possible to form the pressure-sensitive adhesive that exhibits adequate cohesion and stress relaxation property depending on a change in temperature and thus maintains excellent properties required for an optical film such as dependability, light leakage prevention property, and reworkability.

In an example, the block copolymer may be a cross-linkable copolymer including a cross-linkable functional group. Examples of the cross-linkable functional group may include a hydroxyl group, a carboxyl group, an isocyanate group, or a glycidyl group, and for example, a hydroxyl group may be used. Such a cross-linkable functional group can be introduced by polymerizing a copolymerizable monomer having a cross-linkable functional group.

In the field of manufacturing an adhesive, various copolymerizable monomers having a cross-linkable functional group are well known, and such monomers can be used in the polymer. For example, as a copolymerizable monomer having a hydroxyl group, hydroxyalkyl(meth)acrylate such as 2-hydroxyethyl (meth)acrylate, 2-hydroxypropyl(meth)acrylate, 4-hydroxybutyl (meth)acrylate, 6-hydroxyhexyl (meth)acrylate, or 8-hydroxyoctyl(meth)acrylate, or hydroxyalkyleneglycol(meth)acrylate such as 2-hydroxyethyleneglycol(meth)acrylate or 2-hydroxypropyleneglycol (meth)acrylate may be used, but it is not limited thereto. Further, hydroxyalkyl acrylate may be used in consideration of reactivity with another monomer constituting the first block or the second block, or easiness in regulation of a glass transition temperature, but it is not limited thereto.

If necessary, the first block and/or the second block may further include, for example, any other comonomer in order to regulate a glass transition temperature, and the monomer may be included as a polymerized unit. The comonomer may include nitrogen-containing monomers such as (meth)acrylonitrile, (meth)acrylamide, N-methyl (meth)acrylamide, N-butoxy methyl (meth)acrylamide, N-vinyl pyrrolidone, or N-vinyl caprolactam; alkyleneoxide group-containing monomers such as alkoxy alkyleneglycol(meth) acrylic acid ester, alkoxy dialkyleneglycol(meth)acrylic acid ester, alkoxy trialkyleneglycol(meth)acrylic acid ester, alkoxy tetraalkyleneglycol(meth)acrylic acid ester, alkoxy polyethyleneglycol(meth)acrylic acid ester, phenoxy alkyleneglycol(meth)acrylic acid ester, phenoxy dialkyleneglycol(meth)acrylic acid ester, phenoxy trialkyleneglycol (meth)acrylic acid ester, phenoxy tetraalkyleneglycol(meth) acrylic acid ester, or phenoxy polyalkyleneglycol(meth) acrylic acid ester; styrene-based monomers such as styrene or methyl styrene; glycidyl group-containing monomers such as glycidyl(meth)acrylate; or carboxylic acid vinyl ester such as vinyl acetate, but is not limited thereto. One or two or more comonomers may be appropriately selected and included in a polymer as necessary. Such a comonomer may be included in the block copolymer in an amount of, for example, 20 parts by weight or less, or 0.1 part by weight to 15 parts by weight with respect to the weight of the other monomer in each block.

In an example, the block copolymer may be a diblock copolymer formed of the first block and the second block, i.e. a block copolymer including only two blocks, the first block and the second block. Due to a use of the diblock copolymer, dependability, stress relaxation property, and reworkability of the pressure-sensitive adhesive can be maintained excellent.

The block copolymer may include, for example, 10 to 50 parts by weight of the first block and 50 to 90 parts by weight of the second block. By regulating a weight ratio between the first block and the second block, it is possible to provide a pressure-sensitive adhesive composition and pressure-sensitive adhesive having excellent properties. In another example, the block copolymer may include 5 to 45 parts by weight of the first block and 55 to 95 parts by weight of the second block, or 5 to 40 parts by weight of the first block and 60 to 95 parts by weight of the second block.

A method of preparing the block copolymer is not particularly limited, and the block copolymer can be prepared by a typical method. The block copolymer can be polymerized by a Living Radical Polymerization (LRP) method. Examples of the LRP method include: anionic polymerization using an organic rare-earth metal composite as a polymerization initiator or using an organic alkali metal compound as a polymerization initiator for polymerization in the presence of inorganic acid salts such as salts of alkali metal or alkali earth metal; anionic polymerization using an organic alkali metal compound as a polymerization initiator for polymerization in the presence of an organic aluminum compound; atom transfer radical polymerization (ATRP) using an atom transfer radical polymerization agent as a polymerization control agent; ARGET (Activators Regenerated by Electron Transfer) atom transfer radical polymerization (ATRP) using an atom transfer radical polymerization agent as a polymerization control agent for polymerization in the presence of an organic or inorganic reducing agent that generates electrons; ICAR (Initiators for Continuous Activator Regeneration) atom transfer radical polymerization (ATRP); reversible addition-fragmentation chain transfer (RAFT) polymerization using an inorganic reducing agent and a reversible addition-fragmentation chain transfer agent; or a method using an organic tellurium compound as an initiator. An appropriate method can be selected from the above methods.

The pressure-sensitive adhesive composition may further include a multifunctional cross-linker capable of cross-linking the block copolymer. As the multifunctional cross-linker, there may be used a cross-linker having at least two functional groups which can react with the cross-linkable functional group included in the block copolymer. Examples of the multifunctional cross-linker may include an isocyanate cross-linker, an epoxy cross-linker, an aziridine cross-linker, or a metal chelate cross-linker, and for example, an isocyanate cross-linker may be used.

The isocyanate cross-linker may include, for example, diisocyanate compounds such as tolylene diisocyanate, xylene diisocyanate, diphenylmethane diisocyanate, hexamethylene diisocyanate, isoboron diisocyanate, tetramethylxylene diisocyanate, or naphthalene diisocyanate, or compounds obtained by reacting the above-described diisocyanate compounds with a polyol. The polyol may include, for example, trimethylol propane.

One or two or more of the above cross-linkers may be used in the pressure-sensitive adhesive composition, but available cross-linkers are not limited thereto.

The multifunctional cross-linker may be included in an amount of, for example, 0.01 part by weight to 10 parts by weight, or 0.01 part by weight to 5 parts by weight, with respect to 100 parts by weight of the block copolymer. In this range, a gel fraction, cohesion, adhesion strength, and durability of the pressure-sensitive adhesive can be maintained excellent.

Further, the pressure-sensitive adhesive composition according to the present invention may include a radical polymerization initiator in order to efficiently induce a reaction of the radical polymerization group.

In an example, the radical polymerization initiator may be included in an amount of 1 part by weight to 5 parts by weight, 1.5 parts by weight to 4.5 parts by weight, or 2 parts by weight to 4 parts by weight with respect to 100 parts by weight of the (meth)acryl-based block copolymer. By regulating an amount of the radical polymerization initiator within the above-described range, properties such as dependability and transparency can be maintained excellent.

The radical polymerization initiator may be, for example, at least one selected from the group consisting of benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-on, 1-hydroxycyclohexylphenylketone, 2-methyl-1-[4-(methylthio)phenyl]-2-morpholino-propane-1-on, 4-(2-hydroxyethoxy)phenyl-2-(hydroxy-2-propyl)ketone, benzophenone, p-phenylbenzophenone, 4,4'-diethyl aminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], and 2,4,6-trimethylbenzoyl-diphenyl-phosphineoxide, but it is not limited thereto.

The pressure-sensitive adhesive composition according to the present invention may further include a silane coupling agent. As the silane coupling agent, there may be used a silane coupling agent having, for example, a β-cyano group or an acetoacetyl group. Such a silane coupling agent may enable a pressure-sensitive adhesive formed of a copolymer having a low molecular weight to exhibit excellent adhesion and adhesion stability and also to maintain excellent dependability under a heat-resistant and wet heat-resistant condition.

As the silane coupling agent having a β-cyano group or an acetoacetyl group, there may be used a compound expressed by, for example, the following Chemical Formula 6 or 7.

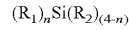  [Chemical Formula 6]

  [Chemical Formula 7]

In the above Chemical Formula 6 or 7, $R_1$ represents a β-cyanoacetyl group or a β-cyanoacetylalkyl group, $R_3$ represents an acetoacetyl group or an acetoacetylalkyl group, $R_2$ represents an alkoxy group, and n represents a number of 1 to 3.

In the Chemical Formula 6 or 7, the alkyl group may be an alkyl group having 1 to 20 carbon atoms, 1 to 16 carbon atoms, 1 to 12 carbon atoms, 1 to 8 carbon atoms, or 1 to 4 carbon atoms, and such an alkyl group may be a straight chain, branched chain, or cyclic alkyl group.

Further, in the Chemical Formula 6 or 7, the alkoxy group may be an alkoxy group having 1 to 20 carbon atoms, 1 to 16 carbon atoms, 1 to 12 carbon atoms, 1 to 8 carbon atoms, or 1 to 4 carbon atoms, and such an alkoxy group may be a straight chain, branched chain, or cyclic alkoxy group.

In the above Chemical Formula 6 or 7, the n may be, for example, 1 to 3, 1 to 2, or 1.

The compound of the Chemical Formula 6 or 7 may include, for example, acetoacetylpropyl trimethoxy silane, acetoacetylpropyl triethoxy silane, β-cyanoacetylpropyl trimethoxy silane, or β-cyanoacetylpropyl triethoxy silane, but is not limited thereto.

The silane coupling agent in the pressure-sensitive adhesive composition may be included in an amount of 0.01 part by weight to 5 parts by weight or 0.01 part by weight to 1 part by weight with respect to 100 parts by weight of the block copolymer. In this range, the silane coupling agent may function to effectively endow a pressure-sensitive adhesive with desired physical properties.

The pressure-sensitive adhesive composition may further include a tackifier, as necessary. For example, the tackifier may include a hydrocarbon resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin, or polymerized rosin ester resin, which may be used alone or in combination, but is not limited thereto. In the pressure-sensitive adhesive composition, the tackifier may be included in an amount of 100 parts by weight or less with respect to 100 parts by weight of the block copolymer.

Further, if necessary, the pressure-sensitive adhesive composition may further include at least one additive selected from the group consisting of an epoxy resin, a curing agent, a UV stabilizer, an antioxidant, a coloring agent, a reinforcing agent, a filler, an antifoaming agent, a surfactant, and a plasticizer.

In addition, the pressure-sensitive adhesive composition may have a gel fraction of 80 weight % or less after a cross-linked structure is realized. The gel fraction can be calculated from the following General Formula 1:

$$\text{Gel fraction}(\%) = B/A \times 100 \quad \text{[General Formula 1]}$$

In the General Formula 1, A represents a mass of the pressure-sensitive adhesive composition in which a cross-linked structure is realized, and B represents a dry weight of a non-dissolved parts obtained after putting the pressure-sensitive adhesive composition, of which a weight is A, in a 200-mesh net and immersing it in ethyl acetate at room temperature for 72 hours.

When the gel fraction is maintained at 80 weight % or less, excellent workability, dependability, and reworkability can be maintained. The lower limit of the gel fraction of the pressure-sensitive adhesive composition is not particularly limited, and may be, for example, 0 weight %. However, a gel fraction of 0 weight % does not mean that cross-linking is not carried out at all in the pressure-sensitive adhesive composition. For example, a pressure-sensitive adhesive composition having a gel fraction of 0 weight % may include a pressure-sensitive adhesive composition in which cross-linking is not carried out at all or a pressure-sensitive adhesive composition in which cross-linking is carried out to some degree but the degree of cross-linking is low, and thus, gel is not maintained in the 200-mesh net but may leak from the net.

The pressure-sensitive adhesive composition may be a pressure-sensitive adhesive composition for an optical film. The pressure-sensitive adhesive composition for an optical film can be used for laminating optical films such as a polarizing film, a retardation film, an anti-glare film, a compensation film for wide angular field of view, or a brightness enhancement film or for attaching the optical film or its laminate to an adherend such as a liquid crystal panel. In an example, the pressure-sensitive adhesive composition may be a pressure-sensitive adhesive composition for a polarizing plate and may be used for attaching a polarizing film to a liquid crystal panel.

The present invention relates to a pressure-sensitive adhesive optical laminate. The pressure-sensitive adhesive optical laminate may include, for example, an optical film; and a pressure-sensitive adhesive layer formed on one or both surfaces of the optical film. The pressure-sensitive adhesive layer may be a pressure-sensitive adhesive layer for attaching the optical film to a liquid crystal panel of an LCD device or another optical film. Further, the pressure-sensitive adhesive layer may contain the above-described pressure-sensitive adhesive composition of the present invention. The pressure-sensitive adhesive composition may be included in the pressure-sensitive adhesive layer in the state where a cross-linked structure is realized. The optical film may include, for example, a polarizing film, a retardation film, a brightness enhancement film, or a laminate of two or more of these films.

Further, the present invention relates to a pressure-sensitive adhesive polarizing plate. The polarizing plate may have, for example, a structure in which an optical film of the pressure-sensitive adhesive optical laminate is a polarizing film.

The polarizing film included in the polarizing plate is not particularly limited in kind, and may employ general polarizing films well known in the art, such as a polyvinylalcohol-based polarizing film without limitation.

The polarizing film is a functional film capable of extracting only light vibrating in one direction from incident light vibrating in various directions. For example, in the polarizing film, a dichroic dye may be adsorbed and arranged to a polyvinylalcohol-based resin film. The polyvinylalcohol-based resin constituting the polarizing film may be obtained by, for example, gelating a polyvinylacetate-based resin. In this case, the polyvinylacetate-based resin to be used may also include vinyl acetate and a copolymer of another monomer capable of being copolymerized with the vinyl acetate as well as a homopolymer of the vinyl acetate. The monomer capable of being copolymerized with the vinyl acetate may be, but is not limited to, one or a mixture of at least two of unsaturatedcarboxylic acids, olefins, vinylethers, unsaturated sulfonic acids, and acrylamides having an ammonium group. The degree of gelation of the polyvinylalcohol-based resin may be typically about 85 mol % to about 100 mol %, and preferably 98 mol % or more. The polyvinylalcohol-based resin may be further modified, and may be, for example, polyvinylformal or polyvinylacetal modified with an aldehyde. The degree of polymerization of the poylvinylalcohol-based resin may be typically about 1,000 to about 10,000, or about 1,500 to about 5,000.

The polarizing film may be manufactured through stretching a polyvinylalcohol-based resin film (e.g., uniaxial stretching), dying the polyvinylalcohol-based resin film with a dichroic dye, adsorbing the dichroic dye, treating the polyvinylalcohol-based resin film to which the dichroic dye is adsorbed with a boric acid aqueous solution, and then washing the polyvinylalcohol-based resin film. As the dichroic dye, iodine or a dichroic organic pigment may be used.

The polarizing plate may further include a protection film attached to one or both surfaces of the polarizing film, and in this case, the pressure-sensitive adhesive layer may be formed on one surface of the protection film. The protection film is not specifically limited in kind, and thus may include: a cellulose-based film formed of, for example, triacetyl cellulose (TAC); a polyester-based film such as a polycarbonate film or a poly(ethylene terephthalate) (PET) film; a polyethersulfone-based film; or a film having one layer or two or more layers of a laminated structure having a polyethylene film, a polypropylene film, and a polyolefin-based film prepared using a resin having a cyclo-based or norbornene structure or an ethylene-propylene copolymer.

The polarizing plate may further include at least one functional layer selected from the group consisting of a protection layer, a reflective layer, an anti-glare layer, a retardation plate, a compensation film for wide angular field of view, and a brightness enhancement film.

In the present invention, a method of forming a pressure-sensitive adhesive layer on the polarizing plate or the optical film is not specifically limited. For example, there may be used a method of directly coating and curing the pressure-sensitive adhesive composition on the polarizing plate or the optical film so as to realize a cross-linked structure, or a method of coating and curing the pressure-sensitive adhesive composition to a release-treated surface of a releasable film so as to form a cross-linked structure and transferring the resultant composition onto the polarizing plate or the optical film.

A method of coating a pressure-sensitive adhesive composition is not specifically limited, and may include, for example, a method of applying a pressure-sensitive adhesive composition using a typical means such as a bar coater.

For uniform coating, a multifunctional cross-linker included in the pressure-sensitive adhesive composition may be preferably controlled not to perform a cross-linking reaction of functional groups during the coating process. Accordingly, a cross-linked structure may be formed in a curing and aging process of the cross-linker after the coating process, and thus, cohesion of the pressure-sensitive adhesive may be improved, and also, adhesive properties and cuttability may be improved.

Further, preferably, the coating process may be performed after a volatile component or a bubble-forming component such as reaction residue in the pressure-sensitive adhesive composition is sufficiently removed. Accordingly, it is possible to prevent problems that the modulus of elasticity of the pressure-sensitive adhesive is decreased due to excessively low cross-linking density or molecular weight, and that bubbles present between a glass plate and a pressure-sensitive adhesive layer become larger at a high temperature, thereby forming a scatterer therein.

A method of curing the pressure-sensitive adhesive composition to realize a cross-linked structure after the coating process is not particularly limited. For example, a curing process may be carried out by maintaining the coating layer at an adequate temperature so as to cause a cross-linking reaction between the block copolymer and the multifunctional cross-linker included within the coating layer.

Furthermore, the present invention relates to a display device, for example, an LCD device. The display device may include, for example, a liquid crystal panel; and the polarizing plate or optical laminate attached to one or both surfaces of the liquid crystal panel. The polarizing plate or optical laminate may be attached to the liquid crystal panel with the above-described pressure-sensitive adhesive.

As a liquid crystal panel in the display device, a well-known panel such as a passive matrix-type panel including a twisted nematic (TN) panel, a super twisted nematic (STN) panel, a ferroelectric (F) panel, or a polymer dispersed (PD) panel; an active matrix-type panel including a two or three terminal panel; an in-plane switching (IPS) panel; and a vertical alignment (VA) panel may be used.

The other components of the liquid crystal display device, for example, a color filter substrate or an upper and lower substrate such as an array substrate, are not specifically limited in kind, and a conformation well known in the art may be employed without limitation.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, a pressure-sensitive adhesive composition will be described in detail with reference to Examples and Comparative Examples, but a range of the pressure-sensitive adhesive composition is not limited by the following Examples and Comparative Examples.

1. Evaluation of Molecular Weight

A number average molecular weight (Mn) and a molecular weight distribution (PDI) were measured using a GPC under the following conditions. To prepare a calibration curve, measurement results were converted using standard polystyrene produced by Agilent System.

<Measurement Conditions>

Gauge: Agilent GPC (Agilent 1200 series, U.S.)
Column: Two PL Mixed Bs connected
Column Temperature: 40° C.
Eluent: THF (Tetrahydrofuran)
Flow Rate: 1.0 mL/min
Concentration: About 1 mg/mL (100 µL injection)

2. Time-Dependency Evaluation of Adhesion Strength

The pressure-sensitive adhesive polarizing plate was cut into a size of 25 mm×100 mm (width×length) to prepare a sample, and then attached to an alkali-free glass using a laminator after removing a peeling sheet. Then, the resultant product was pressed in an autoclave (50° C., 0.5 atm) for about 20 minutes, and stored under constant temperature/humidity conditions (23° C., 50% RH) for 4 hours. Then, adhesion strength was measured under a condition in a peeling speed of 300 mm/min and a peeling angle of 180 degrees using Texture analyzer (Stable Micro Systems Ltd., U.K.), and time-dependency of the adhesion strength was evaluated according to the following criteria:

<Evaluation Criteria>

○: after 1 day, adhesion strength being 1,000 or less
Δ: after 3 days, adhesion strength being 1,000 or less
X: after 6 days, adhesion strength being 1,000 or less 3. Evaluation of Heat-Resistant and Moisture-Resistant Durability Polarizing plates prepared in Examples and Comparative Examples were cut into pieces having a width of about 180 mm and a length of about 320 mm to prepare samples. The samples were attached to a 19-inch commercially available panel. Then, the panel was kept in an autoclave (50° C., 5 atm) for about 20 minutes to prepare samples. The heat-resistant durability of the prepared samples was evaluated according to the following evaluation criteria after the samples were kept at 80° C. for 500 hours and appearance of bubbles and peels were observed, and the moisture-resistant durability was evaluated according to the following evaluation criteria after the samples were left at 60° C. with a relative humidity of 90% for 500 hours and then appearance of bubbles and peels at a pressure-sensitive adhesive interface were observed:

<Evaluation Criteria>

A: Bubbles and peels are not generated.

B: Bubbles and/or peels are slightly generated.

C: Bubbles and/or peels are highly generated.

4. Measurement of Interfacial Adhesion Strength

The pressure-sensitive adhesive compositions prepared in Examples and Comparative Examples were coated and attached to a polarizing plate, and the polarizing plate was cut into a size of 50 mm×100 mm to prepare a sample. 3 days after the sample was prepared, a release film of the sample was removed, and an adhesive tape was laminated. 30 minutes after lamination, the adhesive tape was peeled at an adequate speed, and then, an amount of the pressure-sensitive adhesive remaining on the polarizing plate was measured.

<Evaluation Criteria>

○: Pressure-sensitive adhesive residue of 80% or more

Δ: Pressure-sensitive adhesive residue of 30% or more to 80% or less

X: Pressure-sensitive adhesive residue of 30% or less

5. Calculation of Glass Transition Temperature

Glass transition temperatures Tg of the respective blocks of the block copolymer were calculated according to the following Equation:

<Equation>

$$1/Tg = \Sigma Wn/Tn$$

In the above Equation, Wn represents a weight fraction of a monomer used in each block, and Tn represents a glass transition temperature when the monomer used forms a homopolymer.

That is, the right hand side in the above Equation is the sum of values (Wn/Tn) of respective monomers calculated by dividing a weight fraction of a monomer used by a glass transition temperature when the monomer forms a homopolymer.

6. Measurement of Conversion Rate and Composition Ratio of Monomer

Conversion rates of methyl methacrylate (MMA) as a main monomer constituting a first block and butyl acrylate (BA) as a main monomer constituting a second block during polymerization in block copolymers of Examples and Comparative Examples and composition contents thereof in the block copolymers were calculated according to the following Equation based on a result of 1H-NMR.

<MMA Conversion Rate>

$$\text{MMA Conversion Rate}(\%) = 100 \times B/(A+B)$$

In the above Equation, A represents an area of a peak (around 3.4 ppm to 3.7 ppm) derived from a methyl group induced from MMA included in the polymer in the 1H-NMR spectrum, and B represents an area of a peak (around 3.7 ppm) derived from a methyl group of unpolymerized MMA. That is, a conversion rate of the monomer was calculated in consideration of a movement position of the methyl group peak in the MMA structure.

<BA Conversion Rate>

$$\text{BA Conversion Rate}(\%) = 100 \times C/(C+D)$$

In the above Equation, D represents an area of a peak (around 5.7 ppm to 6.4 ppm) derived from $=CH_2$ at a double bond terminal of BA in the 1H-NMR spectrum, and C represents an area of a peak (around 3.8 ppm to 4.2 ppm) derived from $—OCH_2—$ present in the polymer formed by polymerization of BA. That is, a conversion ratio of BA was measured by calculating relative values of the $=CH_2$ peak of BA and the $—OCH_2—$ peak of the polymer.

<Calculation of Composition Ratio>

A ratio between a first block and a second block in a block copolymer was calculated according to the following Equation based on a ratio between methyl methacrylate (MMA) and butyl acrylate (BA) as main monomers constituting the first block and the second block, respectively.

<Equation>

$$\text{MMA Content}(\%) \text{ in Block Copolymer} = 100 \times \text{MMA Peak Area/BA Peak Area}$$

In the above Equation, the MMA peak area is an area per 1H proton of the peak (peak observed due to $—CH_3$ derived from MMA) around 3.4 ppm to 3.7 ppm in the 1H-NMR, and the BA peak area is an area per 1H proton of the peak (peak observed due to $—OCH_2—$ present in the polymer formed of BA) around 3.8 ppm to 4.2 ppm in the 1H-NMR.

That is, a weight ratio between the first and second blocks was calculated by calculating relative values of the $—CH_3$ peak of the MMA structure and the $—OCH_2$-peak of the polymer formed of BA.

7. Evaluation of Transparency

Each of the pressure-sensitive adhesive compositions prepared in Examples and Comparative Examples was coated onto a release-treated surface of a 38 μm-thick PET (poly(ethyleneterephthalate)) film (MRF-38 manufactured by Mitsubishi Corporation) release-treated so that a thickness after drying could be about 40 μm, and kept at 110° C. for about 3 minutes in an oven. Then, transparency of the coated pressure-sensitive adhesive layer was observed with the naked eye and evaluated according to the following evaluation criteria.

<Evaluation Criteria>

A: A coated layer is very transparent.

B: A coated layer is slightly transparent, opaque, or extremely opaque.

PREPARATION EXAMPLE 1

Preparation of Block Copolymer (A1)

0.1 g of EBiB (ethyl 2-bromoisobutyrate) and 14.2 g of methyl methacrylate (MMA) were mixed with 6.2 g of ethyl acetate (EAc). A flask of the mixture was sealed with a rubber film, and the mixture was nitrogen-purged and stirred at about 25° C. for about 30 minutes. Then, dissolved oxygen was removed by bubbling. Then, 0.002 g of $CuBr_2$, 0.005 g of TPMA (tris(2-pyridylmethyl)amine), and 0.017 g of V-65 (2,2'-azobis(2,4-dimethyl valeronitrile)) were added to the mixture from which oxygen was removed, and the resultant mixture was immersed in a reactor at about 67° C. to initiate a reaction (polymerization of a first block). At the time when a conversion rate of methyl methacrylate was about 75%, a mixture of 115 of butyl acrylate (BA) previously undergoing bubbling with nitrogen, 0.8 g of hydroxybutyl acrylate (HBA), and 250 g of ethyl acetate (EAc) was added thereto in the presence of nitrogen. Then, 0.006 g of $CuBr_2$, 0.01 g of TPMA, and 0.05 g of V-65 were put into the reaction flask to carry out a chain extension reaction (polymerization of a second block). When a conversion rate of the monomer (BA) reached 80% or more, the reaction mixture was exposed to oxygen and diluted in an adequate solvent to terminate the reaction, thereby preparing a block copolymer (In the above process, V-65 was appropriately added in installments in consideration of its half-life until the reaction was terminated.). 1.2 g of methacryloyl isocyanate was added to the polymerized block copolymer, and the resultant mixture was nitrogen-purged and stirred at a reaction temperature of about 50° C. for about 5 hours to carry out a reaction.

PREPARATION EXAMPLES 2 to 4

Preparation of Block Copolymers (A2 and B1 to B2)

Block copolymers were prepared in the same manner as Preparation Example 1 except that kinds of materials and additives used in polymerizing a first block were controlled as shown in the following Table 1, and kinds of materials and additives used in polymerizing a second block were controlled as shown in the following Table 2.

TABLE 1

| | | Material | | | | | | |
|---|---|---|---|---|---|---|---|---|
| | | MMA | BMA | EBiB | EA | $CuBr_2$ | TPMA | V-65 |
| Block copolymer | A1 | 90 | 10 | 0.1 | 6.2 | 0.002 | 0.005 | 0.017 |
| | A2 | 90 | 10 | 0.1 | 6.2 | 0.002 | 0.005 | 0.017 |
| | B1 | 90 | 10 | 0.1 | 6.2 | 0.002 | 0.005 | 0.017 |
| | B2 | 90 | 10 | 0.1 | 6.2 | 0.002 | 0.005 | 0.017 |

Content unit: g
MMA: methyl methacrylate (Homopolymer Tg: about 110° C.)
BMA: butyl methacrylate (Homopolymer Tg: about 27° C.)
EBiB: ethyl 2-bromoisobutyrate
EA: ethyl acetate
TPMA: tris(2-pyridylmethyl)amine
V-65: 2,2'-azobis(2,4-dimethyl valeronitrile)

TABLE 2

| | | Material | | | | | | |
|---|---|---|---|---|---|---|---|---|
| | | BA | HBA | MOI | EA | $CuBr_2$ | TPMA | V-65 |
| Block copolymer | A1 | 97 | 1.5 | 1.2 | 250 | 0.006 | 0.01 | 0.05 |
| | A2 | 97 | 3 | 2.5 | 250 | 0.006 | 0.01 | 0.05 |
| | B1 | 97 | 1.5 | — | 250 | 0.006 | 0.01 | 0.05 |
| | B2 | 97 | 3 | — | 250 | 0.006 | 0.01 | 0.05 |

Content unit: g
BA: butyl acrylate (Homopolymer Tg: about −45° C.)
HBA: 4-hydroxybutyl acrylate (Homopolymer Tg: about −80° C.)
MOI: methacryloyloxyethyl isocyanate
EA: ethyl acetate
TPMA: tris(2-pyridylmethyl)amine
V-65: 2,2'-azobis(2,4-dimethyl valeronitrile)

Properties of the respective block copolymers prepared by the above method are as shown in the following Table 3.

TABLE 3

| | | Block copolymer | | | |
|---|---|---|---|---|---|
| | | A1 | A2 | B1 | B2 |
| First block | MMA ratio | 90 | 90 | 90 | 90 |
| | BMA ratio | 10 | 10 | 10 | 10 |
| | Tg (° C.) | 90 | 90 | 90 | 90 |
| | Mn (×10000) | 3.5 | 3.6 | 3.5 | 3.6 |
| | PDI | 1.34 | 1.34 | 1.34 | 1.34 |
| Second block | BA ratio | 97 | 97 | 97 | 97 |
| | HBA ratio | 1.5 | 3 | 1.5 | 3 |
| | MOI ratio | 1.2 | 1.5 | — | — |
| | Tg (° C.) | −45 | −45 | −45 | −45 |
| Block copolymer | Mn (×10000) | 10.6 | 10.6 | 10.6 | 10.6 |
| | PDI | 1.8 | 1.8 | 1.8 | 1.8 |
| | First block: Second block (Weight ratio) | 10.1:89.9 | 10.1:89.9 | 10.1:89.9 | 10.1:89.9 |

Monomer ratio unit: part by weight
MMA: methyl methacrylate (Homopolymer Tg: about 110° C.)
BMA: butyl methacrylate (Homopolymer Tg: about 27° C.)
BA: butyl acrylate (Homopolymer Tg: about −45° C.)
HBA: 4-hydroxybutyl acrylate (Homopolymer Tg: about −80° C.)
MOI: methacryloyloxyethyl isocyanate
Tg: glass transition temperature
Mn: number average molecular weight
PDI: molecular weight distribution

EXAMPLE 1

Preparation of Coating Solution (Pressure-Sensitive Adhesive Composition)

A coating solution (pressure-sensitive adhesive composition) was prepared by mixing 0.04 parts by weight of a cross-linker (Coronate L, produced by NPU, Japan), 0.1 part by weight of DBTDL (Dibutyltin dilaurate), and 0.2 parts by weight of a silane coupling agent having a β-cyanoacetyl group with respect to 100 parts by weight of the block copolymer (A1) prepared in Preparation Example 1, and mixing the resultant mixture with ethyl acetate as a solvent.

Preparation of Pressure-Sensitive Adhesive Polarizing Plate

The prepared coating solution was coated onto a release-treated surface of a 38 μm-thick PET (poly(ethyleneterephthalate)) film (MRF-38 manufactured by Mitsubishi Corporation) release-treated so that a thickness after drying could be about 23 μm, and kept at 110° C. for about 3 minutes in an oven. A pressure-sensitive adhesive polarizing plate was prepared by laminating the coating layer formed on the release-treated PET film on a WV (Wide View) liquid crystal layer of a polarizing plate (TAC/PVA/TAC-laminated structure: TAC=triacetylcellulose, PVA=polyvinylalcohol-based polarizing film), of which one surface was coated with the WV liquid crystal layer, after drying.

EXAMPLE 2 AND COMPARATIVE EXAMPLES 1 to 3

A pressure-sensitive adhesive composition (coating solution) and a pressure-sensitive adhesive polarizing plate were prepared in the same manner as Example 1 except that each component and a ratio were regulated as shown in the following Table 4 when the pressure-sensitive adhesive composition (coating solution) was prepared.

TABLE 4

|  |  | Example | | Comparative Example | | |
|---|---|---|---|---|---|---|
|  |  | 1 | 2 | 1 | 2 | 3 |
| Block copolymer | Kind | A1 | A2 | B1 | B2 | A1 |
|  | Content | 100 | 100 | 100 | 100 | 100 |
| Cross-linker content |  | 0.04 | 0.03 | 0.04 | 0.04 | — |
| DBTDL content |  | 0.1 | 0.1 | 0.1 | 0.1 | 0.1 |
| SCA content |  | 0.2 | 0.2 | 0.2 | 0.2 | 0.2 |

Content unit: part by weight
Cross-linker: Coronate L, produced by NPU, Japan
DBTDL: dibutyltin dilaurate
SCA: silane coupling agent having a β-cyanoacetyl group (M812, produced by LG Chem.)

Property evaluation results of the respective Examples and Comparative Examples are as shown in the following Table 5.

TABLE 5

|  | Example | | Comparative Example | | |
|---|---|---|---|---|---|
|  | 1 | 2 | 1 | 2 | 3 |
| Time-dependency of adhesion strength | ○ | ○ | x | x | ○ |
| Heat-resistant durability | A | A | A | A | A |
| Humidity-resistant durability | A | A | A | A | B |
| Interfacial adhesion strength | ○ | ○ | ○ | ○ | x |
| Transparency | ○ | ○ | ○ | ○ | ○ |

The pressure-sensitive adhesive composition of the present invention can provide a pressure-sensitive adhesive having low time-dependency of dependability and adhesion strength and having excellent interfacial adhesion strength. After being applied to an optical member such as a polarizing plate, the pressure-sensitive adhesive composition exhibits excellent interfacial adhesion strength and maintains excellent dependability without time-dependency.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A pressure-sensitive adhesive composition comprising:
a block copolymer including a first block having a glass transition temperature of 50° C. or more, and a second block having a glass transition temperature of −10° C. or less and including a radical polymerization group and a thermosetting functional group; and
a multifunctional cross-linker,
wherein the block copolymer is a diblock copolymer including the first block and the second block, and the first block comprises a polymerized unit induced from a methacrylic acid ester monomer, and the second block comprises:
a main chain comprising a polymerized unit including an acrylic acid ester monomer and a copolymerizable monomer having the thermosetting functional group in the form of a polymer; and
a radical polymerization compound which is bonded to the thermosetting functional group of the main chain and provides the radical polymerization group,
wherein the radical polymerization compound comprises at least one selected from the group consisting of a compound expressed by the following Chemical Formula 1; a compound expressed by the following Chemical Formula 2; a compound expressed by the following Chemical Formula 3, a reaction product of a multifunctional isocyanate compound and a compound expressed by the following Chemical Formula 4; a reaction product of a multifunctional isocyanate compound, a polyol compound, and a compound expressed by the following Chemical Formula 4, and a compound expressed by the following Chemical Formula 5:

[Chemical Formula 1]

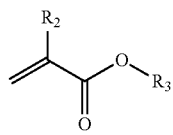

[Chemical Formula 2]

$Si(R_4)_n(R_5)_m(R_6)_l$

[Chemical Formula 3]

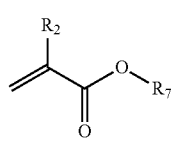

[Chemical Formula 4]

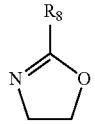

[Chemical Formula 5]

wherein in the above Chemical Formulas 1 to 5, $R_1$ represents an alkyl group substituted with a (meth)acryloxy group; an alkyl group substituted with a (meth)acryloxyalkyl group; an alkyl group substituted with an alkenylphenyl group; a (meth)acryloyl group; a (meth)acryloxy group; or an alkenyl group,
$R_2$ represents hydrogen or an alkyl group,
$R_3$ represents hydrogen; an alkyl group substituted with an aziridinyl group; or a glycidyl group,
$R_4$ represents a (meth)acryloxyalkyl group, $R_5$ represents a halogen atom, $R_6$ represents an alkyl group, $R_7$ represents a hydroxyalkyl group, $R_8$ represents an alkenyl group,
n+m+l represents 4, and n and m independently represent 1 to 3.

2. The pressure-sensitive adhesive composition of claim 1, wherein the main chain includes 90 parts by weight to 99.9 parts by weight of the acrylic acid ester monomer and 0.01 part by weight to 10 parts by weight of the copolymerizable monomer having the thermosetting functional group in the form of a polymer, and
a molar amount of the radical polymerization compound bonded to the main chain is 0.01 time to 1 time, relative to a molar amount of 1 part by weight of the copolymerizable monomer.

3. The pressure-sensitive adhesive composition of claim 1, wherein the thermosetting functional group is a hydroxyl group, a carboxyl group, an amino group, an isocyanate group or an epoxy group.

4. The pressure-sensitive adhesive composition of claim 1, wherein the block copolymer has a number average molecular weight of 50,000 to 300,000.

5. The pressure-sensitive adhesive composition of claim 1, wherein the block copolymer has a molecular weight distribution (PDI) of 1.0 to 2.5.

6. The pressure-sensitive adhesive composition of claim 1, wherein the block copolymer comprises 10 parts by weight to 50 parts by weight of the first block and 50 parts by weight to 95 parts by weight of the second block.

7. The pressure-sensitive adhesive composition of claim 1, wherein the multifunctional cross-linker is an isocyanate cross-linker, an epoxy cross-linker, an aziridine cross-linker or a metal chelate cross-linker.

8. The pressure-sensitive adhesive composition of claim 1, wherein the multifunctional cross-linker is comprised in an amount of 0.01 part by weight to 10 parts by weight, relative to 100 parts by weight of the block copolymer.

9. The pressure-sensitive adhesive composition of claim 1, further comprising a radical polymerization initiator.

10. The pressure-sensitive adhesive composition of claim 9, wherein the radical polymerization initiator is comprised in an amount of 0.1 part by weight to 5 parts by weight, relative to 100 parts by weight of the (meth)acryl-based block.

11. The pressure-sensitive adhesive composition of claim 1, wherein after a cross-linked structure is realized, a gel fraction is 80 weight% or less.

12. A pressure-sensitive adhesive optical laminate comprising:
an optical film; and
a pressure-sensitive adhesive layer which is formed on one or both surfaces of the optical film, and comprises the cross-linked pressure-sensitive adhesive composition of claim 1.

13. A pressure-sensitive adhesive polarizing plate comprising:
a polarizing film; and
a pressure-sensitive adhesive layer which is formed on one or both surfaces of the polarizing film, and comprises the cross-linked pressure-sensitive adhesive composition of claim 1.

14. A display device comprising:
the pressure-sensitive adhesive optical laminate of claim 12, which is attached to one or both surfaces of a liquid crystal panel.

15. A display device comprising:
the pressure-sensitive adhesive polarizing plate of claim 13, which is attached to one or both surfaces of a liquid crystal panel.

16. The pressure-sensitive adhesive composition of claim 1, wherein the first block has a glass transition temperature of about 50° C. to about 150° C., and the second block has a glass transition temperature of about −10° C. to about −100° C.

17. The pressure-sensitive adhesive composition of claim 1, wherein the first block has a glass transition temperature of about 60° C. to about 140° C., and the second block has a glass transition temperature of about −40° C. to about −90° C.

* * * * *